US011351790B2

(12) United States Patent
Hu

(10) Patent No.: US 11,351,790 B2
(45) Date of Patent: Jun. 7, 2022

(54) THRESHOLD VARIABLE FEEDBACK CIRCUIT, CONSUMABLE CHIP, AND CONSUMABLE

(71) Applicant: HANGZHOU CHIPJET TECHNOLOGY CO., LTD., Hangzhou (CN)

(72) Inventor: Rongming Hu, Hangzhou (CN)

(73) Assignee: HANGZHOU CHIP JET TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/334,011

(22) PCT Filed: Jul. 25, 2018

(86) PCT No.: PCT/CN2018/096995
§ 371 (c)(1),
(2) Date: Mar. 16, 2019

(87) PCT Pub. No.: WO2019/148784
PCT Pub. Date: Aug. 8, 2019

(65) Prior Publication Data
US 2021/0339536 A1 Nov. 4, 2021

(30) Foreign Application Priority Data
Feb. 5, 2018 (CN) .......................... 201810113423.2

(51) Int. Cl.
*B41J 2/175* (2006.01)
*B41J 25/34* (2006.01)
(Continued)

(52) U.S. Cl.
CPC .......... *B41J 2/17546* (2013.01); *G05F 1/575* (2013.01); *G05F 1/59* (2013.01)

(58) Field of Classification Search
CPC ........ B41J 2/17546; B41J 25/34; B41J 2/175; B41J 25/00
See application file for complete search history.

(56) References Cited

U.S. PATENT DOCUMENTS 4,887,098 A * 12/1989 Hawkins .............. B41J 2/04548
347/58
5,144,341 A * 9/1992 El Haten .............. B41J 2/04541
347/12
(Continued)

FOREIGN PATENT DOCUMENTS

CN 1334548 A 2/2002
CN 1986225 A 6/2007
(Continued)

OTHER PUBLICATIONS

International Search Report of PCT Patent Application No. PCT/CN2015/083295 dated Oct. 13, 2015.
(Continued)

*Primary Examiner* — Sisay G Tiku
(74) *Attorney, Agent, or Firm* — Dragon Sun Law Firm, PC; Jinggao Li, Esq.; Nathaniel Perkins

(57) ABSTRACT

The present disclosure relates to the technical field of printer consumables, in particular to threshold variable feedback circuit, consumable chip and consumables. The feedback circuit comprises a control unit; a feedback module including four different feedback units connected in parallel between the output terminal and the ground; each one of the feedback units comprises a gating component and feedback component that are connected in series between the output terminal and the ground; the control unit is electrically connected with the gating component of each one of the feedback units such that the feedback module selects and outputs an electrical signal of one of the feedback units to the output terminal. Selecting different feedback units can
(Continued)

generate different feedback voltages to respond to the verification requirements of the imaging device, so that the consumable can pass the verification of the imaging device.

19 Claims, 7 Drawing Sheets

(51) Int. Cl.
*B41J 25/00* (2006.01)
*G05F 1/575* (2006.01)
*G05F 1/59* (2006.01)

(56) References Cited

U.S. PATENT DOCUMENTS

| | | | | |
|---|---|---|---|---|
| 5,975,670 | A * | 11/1999 | Kikuta | B41J 2/2132 |
| | | | | 347/12 |
| 6,325,483 | B1 * | 12/2001 | Harbour | B41J 2/17503 |
| | | | | 347/19 |
| 7,198,348 | B2 * | 4/2007 | Hu | B41J 2/17546 |
| | | | | 347/19 |
| 8,864,260 | B1 * | 10/2014 | Ge | B41J 2/0458 |
| | | | | 347/9 |
| 9,592,664 | B2 * | 3/2017 | Ge | G06F 3/0688 |
| 2003/0030687 | A1 * | 2/2003 | Hu | B41J 2/17546 |
| | | | | 347/19 |
| 2003/0052745 | A1 * | 3/2003 | Thompson | H03H 7/40 |
| | | | | 333/17.3 |
| 2006/0010687 | A1 | 5/2006 | Bush | |
| 2007/0097745 | A1 * | 5/2007 | Benjamin | H01L 29/7885 |
| | | | | 365/185.14 |
| 2007/0194371 | A1 * | 8/2007 | Benjamin | H01L 29/40114 |
| | | | | 257/320 |
| 2011/0210355 | A1 * | 9/2011 | Yamazaki | H01L 29/7869 |
| | | | | 257/98 |
| 2017/0373353 | A1 * | 12/2017 | Tan | H01M 10/441 |
| 2021/0226531 | A1 * | 7/2021 | Bertolini | G05F 1/575 |

FOREIGN PATENT DOCUMENTS

| | | |
|---|---|---|
| CN | 108215513 A | 6/2008 |
| CN | 108382073 A | 8/2018 |
| WO | WO2017023291 A1 | 9/2017 |

OTHER PUBLICATIONS

Written Opinion of PCT Patent Application No. PCT/CN2015/083295 dated Oct. 13, 2015.

* cited by examiner

THRESHOLD VARIABLE FEEDBACK CIRCUIT, CONSUMABLE CHIP, AND CONSUMABLE

CROSS-REFERENCE TO RELATED PATENT APPLICATION

This application is a national stage application of PCT Application No. PCT/CN2018/096995, filed Jul. 25, 2018, and CN Application No. CN 2018101134232, filed Feb. 5, 2018, entitled "THRESHOLD VARIABLE FEEDBACK CIRCUIT, CONSUMABLE CHIP, CONSUMABLE," by Rongming HU. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND OF THE DISCLOSURE

Technical Field

The present disclosure relates to the technical field of printer consumables, and in particular relates to a threshold variable feedback circuit, a consumable chip and a consumable.

Description of Related Art

When a consumable is installed on an imaging device, the consumable can be used only after passing the certification of the imaging device and the certification of an imaging operation process. In order to pass the certification of the imaging device, the consumable is required to provide feedback and response to the imaging device according to the certification mechanism of the imaging device. The consumable failing to give expected feedback to the imaging device cannot be used on the imaging device.

The consumable includes a plurality of feedback modules for responding to the imaging device. The consumable needs to select a feedback module that is designated by the imaging device according to the requirements of the imaging device to output a feedback voltage to respond to verification requirements of the imaging device. In order to verify the validity of the consumable, the imaging device will perform the above-mentioned verification process multiple times, and the imaging device will deem that the consumable is valid only when all the above-mentioned verification processes triggered by the imaging device are valid.

Therefore, a heretofore unaddressed need exists in the art to address the aforementioned deficiencies and inadequacies.

SUMMARY OF THE DISCLOSURE

To solve the above-mentioned technical problems, the present disclosure provides a threshold variable feedback circuit, characterized by including: a control unit;

a feedback module, including four different feedback units that are connected between an output terminal and ground in parallel;

wherein each one of the feedback units includes a gating component and a feedback component that are connected in series between the output terminal and the ground;

the control unit is electrically connected with the gating component of each one of the feedback units such that the feedback module selects and outputs an electrical signal of one of the feedback units to the output terminal;

wherein the feedback component of a first feedback unit is a first feedback transistor, and when the first feedback unit is selected, the voltage of a drain of the first feedback transistor is output;

wherein the feedback component of a second feedback unit is a second feedback transistor, and when the second feedback unit is selected, the voltage of a drain of the second feedback transistor is output;

wherein the feedback component of a third feedback unit is comprised of a third feedback transistor and a DC power supply that are connected in series, and when the third feedback unit is selected, the sum of the voltage of a drain of the third feedback transistor and the voltage of the DC power supply is output;

wherein the feedback component of a fourth feedback unit is a fourth feedback transistor, and a grid of the fourth feedback transistor is grounded such that the current in the fourth feedback unit is 0 when the fourth feedback unit is selected;

and the width-to-length ratio of the first feedback transistor is different from that of the second feedback transistor.

In the above technical solution, selecting different feedback units can generate different feedback voltages to respond to the verification requirements of the imaging device, so that consumable can pass the verification of the imaging device.

As an optimization, the first feedback transistor, the second feedback transistor, the third transistor and the fourth transistor are common MOS transistors. Common MOS transistors are simple in manufacturing process, and low in production and manufacturing cost.

As an optimization, the first feedback transistor is an NMOS transistor; a grid of the first feedback transistor is connected to the output terminal; a drain of the first feedback transistor is connected to the output terminal; and a source of the first feedback transistor is connected to a corresponding gating component.

As an optimization, the second feedback transistor is an NMOS transistor; a grid of the second feedback transistor is connected to the output terminal; the drain of the second feedback transistor is connected to the output terminal; and a source of the second feedback transistor is connected to a corresponding gating component.

As an optimization, the third feedback transistor is an NMOS transistor; a grid of the third feedback transistor is connected to the output terminal; the drain of the third feedback transistor is connected to the output terminal; a source of the third feedback transistor is connected to the anode of the DC power supply, and the cathode of the DC power supply is connected to a corresponding gating component.

As an optimization, the fourth feedback transistor is an NMOS transistor; the drain of the fourth feedback transistor is connected to the output terminal; and a source of the fourth feedback transistor is connected to a corresponding gating component.

As an optimization, a plurality of feedback modules is provided, and the plurality of feedback modules are connected in parallel. More feedback voltages can be obtained through combinations of a plurality of feedback modules, so that consumable has a wider feedback voltage range.

As an optimization, the control unit is a decoder.

As an optimization, each one of the gating components is arranged between each corresponding one of the feedback units and the ground in a series connection way; each one of the gating components include a first gating transistor and a second gating transistor; a drain of each one of the first gating transistors is connected with the feedback component; a source of each one of the first gating transistors is connected to a drain of each corresponding one of the second gating transistors; a source of each one of the second gating transistors is grounded; and a grid of each one of the first gating transistors and a grid of each one of the second gating transistors are connected to a control output terminal of the control unit.

The present disclosure also provides a consumable chip, characterized by including a storage unit and the feedback circuit according to any one of the above paragraphs, wherein the storage unit is connected to the control input terminal of the control unit.

In the above technical solution, selecting different feedback units for the feedback circuit of the consumable chip can generate different feedback voltages to respond to the verification requirements of the imaging device, so that the consumable can pass the verification of the imaging device.

The present disclosure also provides a consumable chip, characterized by including a consumable container and the above-mentioned consumable chip, wherein the above-mentioned consumable chip is installed on the consumable container.

In the above technical solution, the consumable chip of the consumable can generate different feedback voltages to respond to the verification requirements of the imaging device, so that the consumable can pass the verification of the imaging device.

BRIEF DESCRIPTION OF THE DRAWINGS

The accompanying drawings illustrate one or more embodiments of the present disclosure and, together with the written description, serve to explain the principles of the disclosure. Wherever possible, the same reference numbers are used throughout the drawings to refer to the same or like elements of an embodiment.

DETAILED DESCRIPTION OF THE DISCLOSURE

The implementation modes of the present invention are described in detail in conjunction with the attached drawings.

Specific embodiments are used to explain the present invention, and do not limit the present invention. Those skilled in this field can make modifications without creative contributions to the embodiments upon demands after reading the description, and all modifications within the protective scope of the claims of the present invention shall be protected by the Patent Law.

A consumable includes a consumable container for containing consumables, and a consumable chip installed on the consumable container. The consumable communicates with the imaging device through the consumable chip, sends consumable data to the imaging device and responds to control commands of the imaging device.

Figure 1:
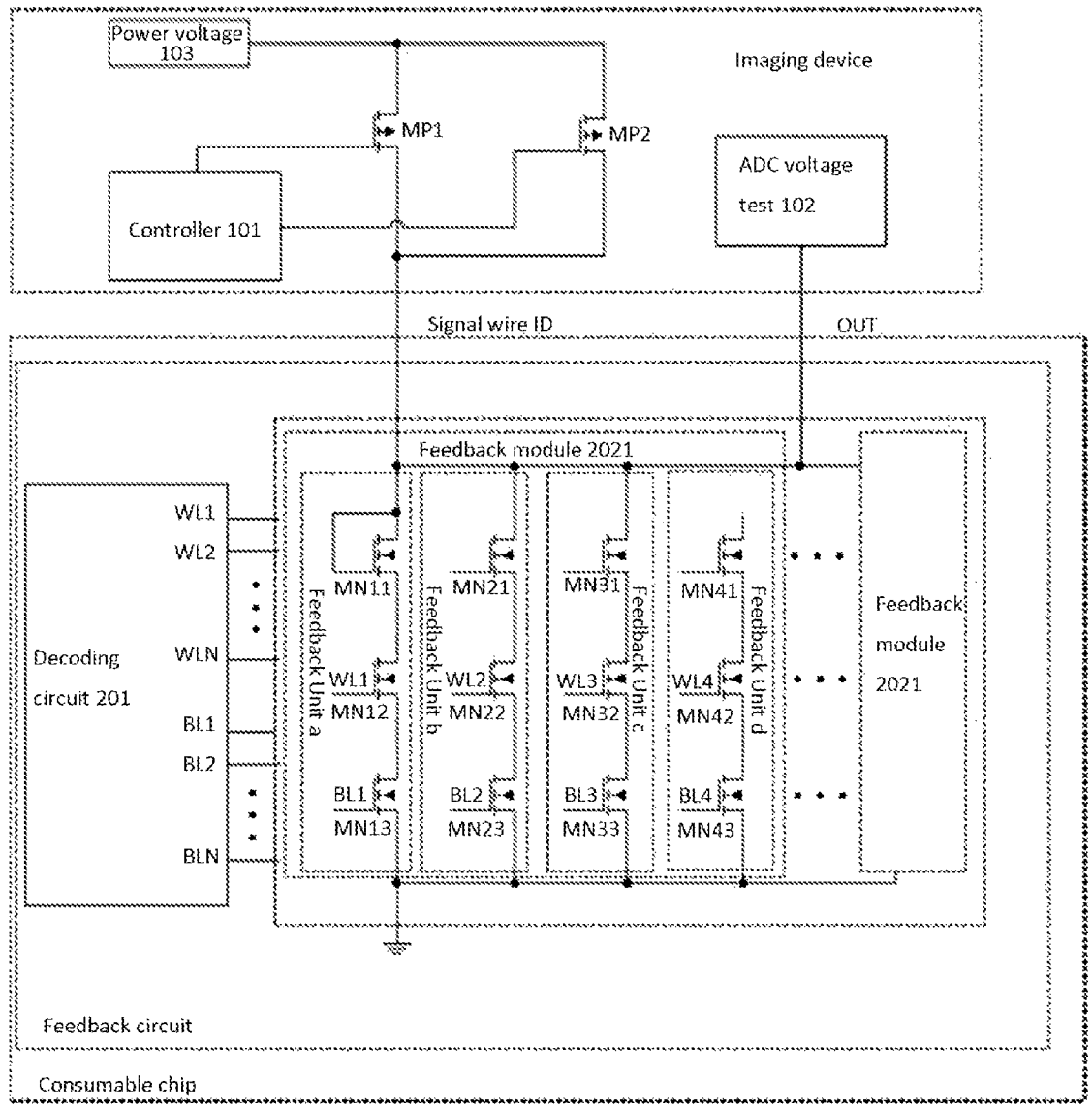
FIG. 1 is a schematic view of the connection between a feedback circuit and an imaging device of the present disclosure.

As shown in FIG. 1, the imaging device controls the on-off of transistors MP1 and MP2 through a controller 101 to switch a signal line ID between a weak driving capacity and a strong driving capacity. The transistors MP1 and MP2 have two on-off states:

(1) MP1 on only: in such case, a power voltage 103 electrifies the signal line ID through the MP1, and the driving capacity of signal line ID is weak, and the maximum current driving capacity of signal line ID is about 1 mA.

(2) MP1 and MP2 both on at the same time: in such case, the power voltage 103 electrifies the signal line ID through the MP1 and MP2 at the same time, and the signal line ID has a strong driving capacity and a maximum current driving capacity of about 100 mA.

The imaging device verifies the consumable in the first state (in the state where only MP1 is on), and the maximum current driving capacity of the signal line ID is about 1 mA.

Figure 2:
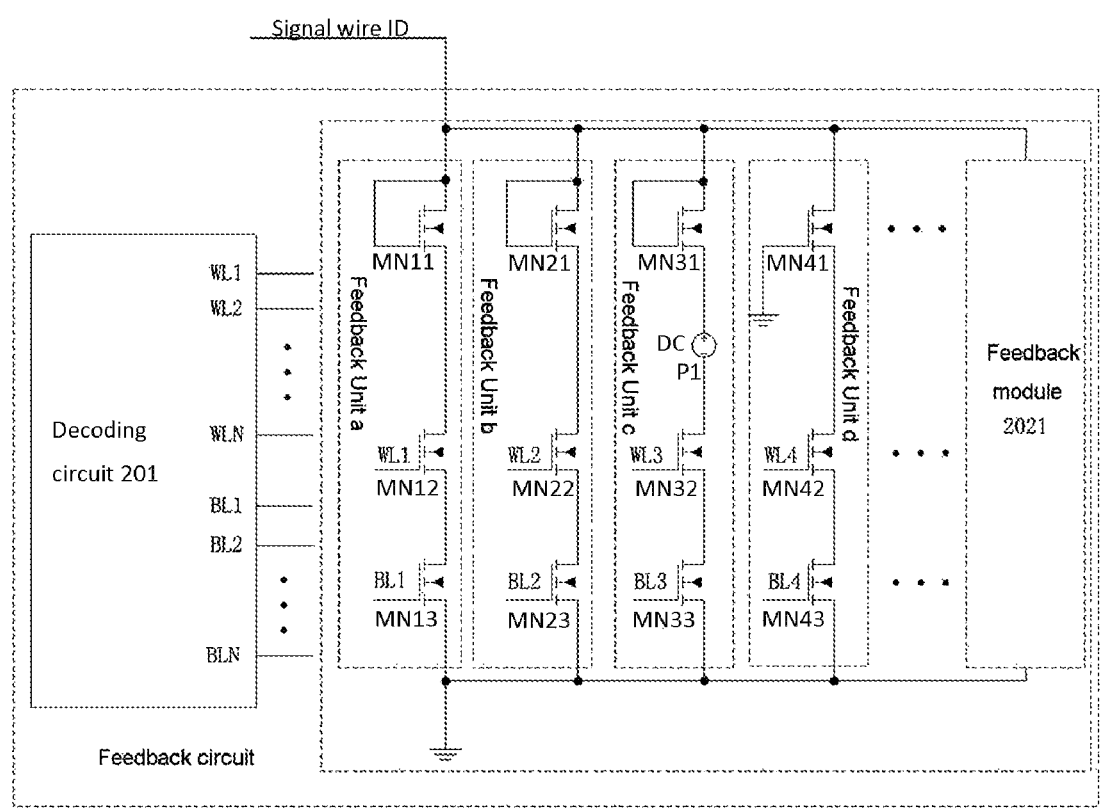
FIG. 2 is a schematic view of a feedback circuit of the present disclosure.

The consumable chip includes a feedback circuit. An output terminal OUT of the feedback circuit is connected to the imaging device through the signal line ID, and the imaging device reads a feedback voltage on the signal line ID to verify the consumable chip. As shown in FIG. 1, the feedback circuit includes a decoder 201 and N groups of feedback modules 2021. The feedback modules 2021 is composed of four different feedback units connected between an output terminal and the ground in parallel, as shown in FIG. 2:

(1) Feedback unit a: the feedback unit a includes three common NMOS transistors MN11, MN12 and MN13, wherein a grid and a drain of the MN11 are short-circuited to the output terminal OUT; a source of the MN11 is connected with a drain of the MN12; a grid of the MN12 is connected with an output terminal WL1 of the decoding circuit 201 and controlled by the output terminal WL1; a source of the MN12 is connected with a drain of the MN13; a grid of the MN13 is connected to an output terminal BL1 of the decoding circuit 201 and controlled by the output terminal BL1, and a source of the MN13 is grounded.

When the decoding circuit 201 controls only the output terminals WL1 and BL1 to output a high level and other output terminals to output a low level, the power voltage 103 of the imaging device flows into a ground line via the feedback unit an only through the switch that is constituted by the MP1 and the MP2. In such case, the current at the output terminal OUT of the consumable chip is limited by the driving capacity of the MN11:

$$I_{dmax}=\frac{1}{2}k_n A_3(V_{ID}-Vth)^2$$

wherein:

$I_{dmax}$ is the maximum current of the signal line ID at this time;

$K_n$ is the transconductance parameter of the NMOS transistor;

$A_3$ is the width-to-length ratio of the MN11;

$V_{ID}$ is the voltage on the signal line ID;

$V_{th}$ is the thread voltage of the NMOS transistor.

When the imaging device verifies the consumable, only the MP1 is switched on. In such case, the voltage on the signal line ID is:

$$V_{ID}=\sqrt{\frac{2*1\text{ mA}}{Kn*A_3}}+Vth \approx 3\text{ V}$$

(2) Feedback unit b: the feedback unit b contains three common NMOS transistors MN21, MN22 and MN23, wherein a grid and a drain of the MN21 are short-circuited to the output terminal OUT; a source of the MN21 is connected with a drain of the MN22; a grid of the MN22 is connected with an output terminal WL2 of the decoding circuit 201 and controlled by the output terminal WL2; a source of the MN22 is connected with a drain of the MN23; a grid of the MN23 is connected to an output terminal BL2 of the decoding circuit 201 and controlled by the output terminal BL2, and a source of the MN23 is grounded. The feedback unit b is structurally similar to the feedback unit a, but the width-to-length ratio of the MN21 in the feedback unit b is inconsistent with that of the MN11 in the feedback unit a.

When the decoding circuit 201 controls only the output terminals WL2 and BL2 to output a high level and other output terminals to output a low level, the power voltage 103 of the imaging device flows into the ground wire via the feedback unit b through the switch that is constituted by the MP1 and the MP2. In such case, the current at the output terminal OUT of the consumable chip is limited by the driving capacity of the MN21:

$$I_{dmax}=\frac{1}{2}k_n A_4(V_{ID}-Vth)^2$$

wherein:

$I_{dmax}$ is the maximum current of the signal line ID at this time;

$A_4$ is the width-to-length ratio of the MN21.

When the imaging device verifies the consumable, only the MP1 is switched on. In such case, the voltage on the signal line ID is:

$$V_{ID}=\sqrt{\frac{2*1\text{ mA}}{Kn*A_4}}+Vth \approx 3.3\text{ V}.$$

It can be seen that due to the inconsistency in the width-to-length ratios of the MN21 and the MN11, the feedback voltage on the signal line ID is also different.

(3) Feedback unit c: containing three common NMOS transistors MN31, MN32 and MN33, and a DC voltage source P1, wherein a grid and a drain of the MN31 are short-circuited to the output terminal OUT; a source of the MN31 is connected with the anode of the DC voltage source P1, while the cathode of the P1 is connected with a drain of the MN32; a grid of the MN32 is connected to an output terminal WL3 of the decoding circuit 201 and controlled by the output terminal WL3; a source of the MN32 is connected with a drain of the MN33; a grid of the MN33 is connected to an output terminal BL3 of the decoding circuit 201 and controlled by the output terminal BL3, and a source of the MN33 is grounded.

When the decoding circuit controls only the output terminals WL3 and BL3 to output a high level and other output terminals to output a low level, the power voltage 103 flows into the ground wire via the feedback unit c only through the switch that is constituted by the MP1 and the MP2. In such case, the current at a feedback terminal of the consumable chip is limited by the driving capacity of the MN31:

$$I_{dmax}=\frac{1}{2}k_n A_5(V_{ID}-Vth-V_{P1})^2,$$

wherein:

$A_5$ is the width-to-length ratio of the MN31;

$V_{P1}$ is the voltage of the DC voltage source P1.

When the imaging device verifies the consumable, only the MP1 is switched on. In such case, the voltage on the signal line ID is:

$$V_{ID}=\sqrt{\frac{2*1\text{ mA}}{Kn*A_5}}+Vth+V_{P1} \approx 6\text{ V}.$$

From the above equation it can be seen that such structure is equal to enhancing a turn-on voltage of the MN31 from $V_{th}$ to $V_{th}+V_{P1}$.

(4) Feedback unit d: including three common NMOS transistors MN41, MN42 and MN43, Wherein a drain of the MN41 is connected to the output terminal OUT; a grid of the MN41 is grounded; a source of the MN41 is connected with a drain of the MN42; a grid of the MN42 is connected to an output terminal WL4 of the decoding circuit and controlled by the output terminal WL4; a source of the MN42 is connected to a drain of the MN43; a grid of the MN43 is connected to an output terminal BL4 of the decoding circuit and controlled by the output terminal BL4, and a source of the MN43 is grounded.

When the decoding circuit controls only the output terminal WL4 and the output terminal BL4 to output a high level and other output terminals to output a low level, the grid of the MN41 is grounded, so the current of this path is equal to 0 in such circumstances.

When the imaging device verifies (when only the MP1 is switched on) the consumable, the current of this path is equal to 0, so the MP1 works in the deep linear area. In such case, the voltage on the signal line ID is equal to the power voltage (15V).

All NMOS transistors in the above solution may be equivalently implemented using diodes, PMOS transistors, or other active devices.

The decoder 201 of the feedback circuit can select more than two feedback modules 2021 for feedback by the output terminal thereof according to a verification command of the imaging device. In such case, by taking two groups of feedback modules 2021 that are selected at the same time as an example, the voltage of the output terminal of the feedback circuit is as shown in the table below:

| Selected by the decoder | Expected voltage value (V) of the printer | Output voltage (V) of the feedback circuit of the present application |
| --- | --- | --- |
| Only one feedback unit a selected | 3 | 3 |
| Only one feedback unit b selected | 3.3 | 3.3 |
| Only one feedback unit c selected | 6 | 6 |
| Only one feedback unit d selected | 15 | 15 |
| Two feedback units a selected at the same time | 2.5 | 2.55 |
| Two feedback units b selected at the same time | 2.8 | 2.85 |
| Two feedback units c selected at the same time | 5.2 | 5.3 |
| Two feedback units d selected at the same time | 15 | 15 |
| Feedback unit a and feedback unit b selected at the same time | 2.6 | 2.62 |
| Feedback unit a and feedback unit c selected at the same time | 3 | 3 |
| Feedback unit a and feedback unit d selected at the same time | 3 | 3 |
| Feedback unit b and feedback unit c selected at the same time | 3.3 | 3.3 |
| Feedback unit b and feedback unit d selected at the same time | 3.3 | 3.3 |
| Feedback unit c and feedback unit d selected at the same time | 6 | 6 |

The voltage feedback circuit of the present disclosure can respond to the verification command of the imaging device in a relatively wide range through one or more groups of feedback modules, and is highly universal and flexible.

Embodiment 1

Figure 3:
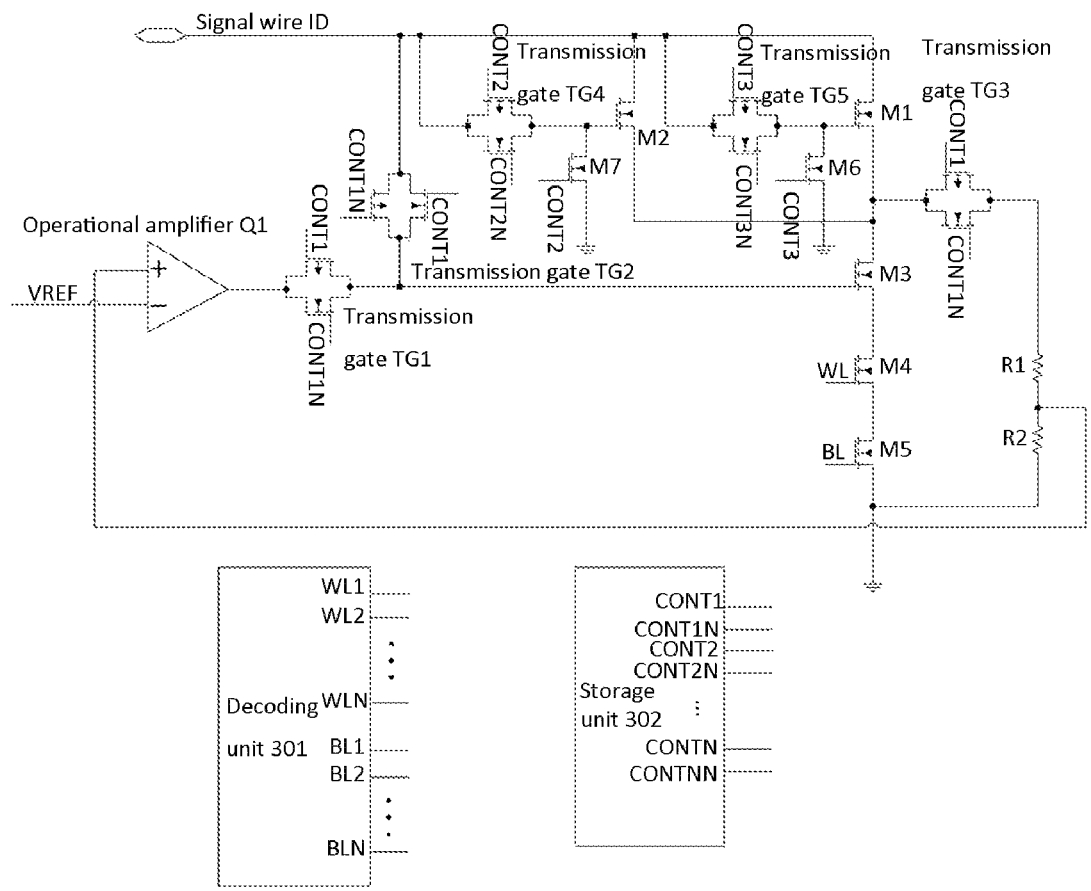
FIG. 3 shows a feedback circuit in Embodiment 1 of the present disclosure.
Figure 4:
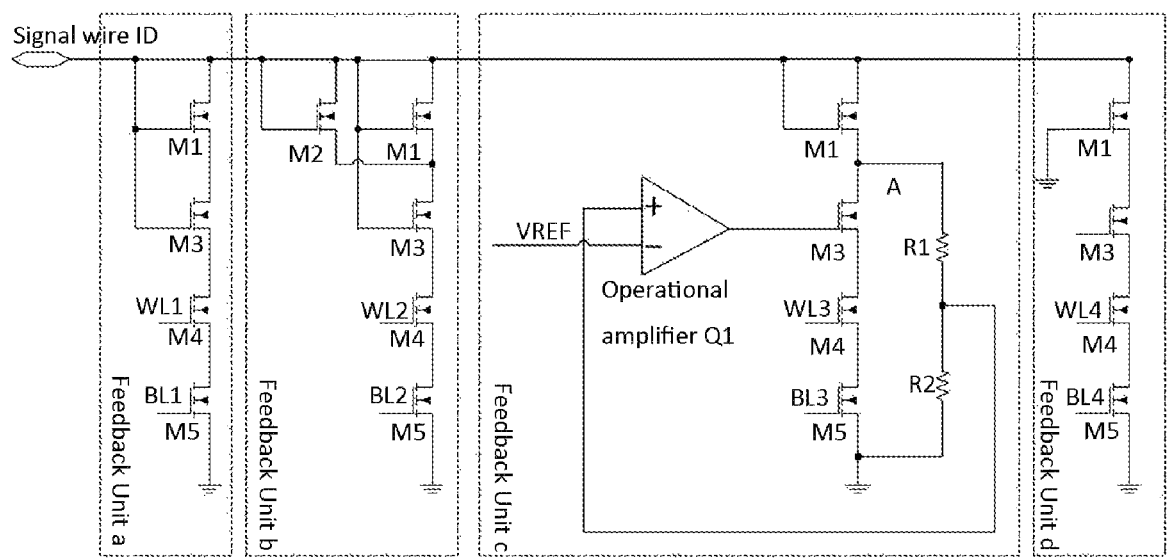
FIG. 4 is an equivalent circuit diagram of the feedback circuit in Embodiment 1 of the present disclosure, in four states.

FIG. 3 shows an implementation way of a feedback circuit of the present disclosure. In this embodiment, a feedback module is switched among four feedback units through a switch under the control of a storage unit 302 (as shown in FIG. 4).

The feedback circuit includes a decoding unit 301, a storage unit 302, five switches TG1-TG5 each constituted by transmission gates, an operational amplifier Q1, seven MOS transistors M1-M7, and two resistors R1-R2, wherein each switch that is constituted by the transmission gates is comprised of a PMOS transistor and an NMOS transistor, wherein a source of each one of the PMOS transistors and a source of each corresponding one of the NMOS transistors are short-circuited as an input, a drain of each one of the PMOS transistors and a drain of each corresponding one of the NMOS transistors are short-circuited as an output, a grid of each one of the PMOS transistors and a grid of each corresponding one of the NMOS transistors are respectively connected with opposite input signals; when the grid of each one of the PMOS transistors is input with a low level and the grid of each corresponding one of the NMOS transistors is input with a high level, each corresponding one of the switches is on; and when the grid of each one of the PMOS transistors is input a high level and the grid of each corresponding one of the NMOS transistors is input a low level, each corresponding one of the switches is off.

The anode input of the operational amplifier Q1 is connected to a negative terminal of the negative feedback resistor R1 and a positive terminal of the R2; the cathode of the Q1 is connected to a reference voltage VREF; and an output terminal of the Q1 is connected to an input terminal of a transmission gate TG1. A grid of an NMOS transistor in a transmission gate TG1 is connected to a CONT1N signal output by the storage unit 302; a grid of a PMOS transistor is connected to a CONT1 signal output by the storage unit 302; and an output terminal of the TG1 is connected with an output terminal of the TG2 and a grid of the M3. An input terminal of a TG2 is connected to an output terminal (namely the signal line ID) of the feedback circuit; a grid of an NMOS transistor in the TG2 is connected to a CONT1 signal output by the storage unit 302; and a grid of a PMOS transistor is connected to the CONT1N signal output by the storage unit 302. A source of the M3 is connected with a drain of the M4, and a drain of the M3 is connected with the sources of the M1 and M2 and an input terminal of a transmission gate TG3. A source of the M4 is connected with a drain of the M5, and a grid of the M4 is connected to a WL signal controlled by the decoder 301. A source of the M5 is grounded, and a grid of the M5 is connected to a BL signal controlled by the decoder 301. An output terminal of the TG3 is connected with a positive terminal of the feedback resistor R1; a grid of an NMOS transistor in the TG3 is connected to the CONT1N signal output by the storage unit 302; and a grid of a PMOS transistor is connected to the CONT1 signal output by the storage unit 302. A negative terminal of the feedback resistor R2 is grounded. A drain of the M1 is connected with the signal line ID, and a grid of the M1 is connected with an output terminal of a transmission gate TG5 and a drain of the M6. An input terminal of the transmission gate TG5 is connected to the signal line ID; a grid of an NMOS transistor in the TG5 is connected to a CONT3N signal output by the storage unit 302; and a grid of a PMOS transistor is connected to a CONT3 signal output by the storage unit 302. A source of the M6 is grounded, and a grid of the M6 is connected to the CONT3 signal output by the storage unit 302. A drain of the M2 is connected to the signal line ID, and a grid of the M2 is connected with an output terminal of the transmission gate TG4 and a drain of the M7. An input terminal of the transmission gate TG4 is connected to the signal line ID; a grid of an NMOS transistor in the TG4 is connected to a CONT2N signal output by the storage unit 302; and a grid of a PMOS transistor is connected to a CONT2 signal output by the storage unit 302. A source of the M7 is grounded, and a grid of the M7 is connected to the CONT2 signal output by the storage unit 302.

The decoding unit 301 outputs control gating signals WL1-N and BL1-N to gate a feedback module in the feedback circuit; and the storage unit 302 outputs switching signals CONT1-N and CONTN1-N to control the state of the feedback module. The feedback module as shown in FIG. 3, equivalent to the four feedback units in FIG. 4, can be controlled with the switching signals output by the storage unit 302.

(1) Feedback Unit a

In the case of CONT1=H (high level) and CONT1N=L (low level), the TG1 under control is not on, the TG2 is on, and the TG3 is not on. Thus, the grid of the M3 is connected to the signal line ID, and the drain of the M3 is not connected with the feedback resistor R1.

In the case of CONT2=H and CONT2N=L, the TG4 under control is not on, and the M7 under the control of the CONT2 is on. At this time, the grid of the M2 is pulled to the ground level by the M7, and M2 will not be on.

In the case of CONT3=L and CONT3N=H, the TG5 under control is on, an the M6 under the control of the CONT3 is not on. At this time, the grid of the M1 is connected to the signal line ID, and the M1 will be connected into an MOS transistor which short-circuits the grid and the drain.

Based on the above, the feedback module is equivalent to the feedback unit a in FIG. 4. The feedback unit a is equivalent to the feedback unit a in FIG. 2 of the present disclosure.

(2) Feedback Unit b

In the case of CONT1=H and CONT1N=L, the TG1 under control is not on, the TG2 is on, and the TG3 is not on. Thus, the grid of the M3 is connected to the signal line ID, and the drain of the M3 is not connected with the feedback resistor R1.

In the case of CONT2=L and CONT2N=H, the TG4 under control is on, and the M7 is not on. At this time, the grid of the M2 is connected to the signal line ID, and the M2 will be connected into an MOS transistor which short-circuits the grid and the drain.

In the case of CONT3=L and CONT3N=H, the TG5 under control is on, and the M6 is not on. At this time, the grid of the M1 is connected to the signal line ID, and the M1 will be connected into an MOS transistor which short-circuits the grid and drain.

Based on the above, the feedback module is equivalent to the feedback unit b in FIG. 4, and the feedback unit b is equivalent to the feedback unit b in FIG. 2 in the presented solution.

(3) Feedback Unit c

In the case of CONT1=L and CONT1N=H, the TG1 under control is on, the TG2 is not on, and the TG3 is on. Thus, the grid of the M3 is connected to the output terminal of the operational amplifier Q1, and the drain of the M3 is connected with the feedback resistor R1.

In the case of CONT2=H and CONT2N=L, the TG4 under control is not on, and the M7 is on. At this time, the grid of the M2 is pulled to the ground level by the M7, and the M2 will not be on.

In the case of CONT3=L and CONT3N=H, the TG5 under control is on, the M6 is not on. At this time, the grid of the M1 is connected to the signal line ID, and the M1 will be connected into an MOS transistor which short-circuits the grid and drain.

Based on the above, the feedback module is equivalent to the feedback unit c in FIG. 4. In the feedback unit c, the operational amplifier Q1, M3, R1 and R2 form a negative feedback circuit. With the existence of the negative feedback circuit, the voltage of a point A is fixed at $$V_A = V_{REF} * \frac{R_1 + R_2}{R_2},$$

so that the operational amplifier Q1 is equivalent to a $$V_A = V_{REF} * \frac{R_1 + R_2}{R_2}$$

constant voltage source. The feedback module is equivalent to the feedback unit c in FIG. 2 of the present disclosure.

(4) Feedback Unit d

In the case of CONT2=H and CONT2N=L, the TG4 under control is not on, and the M7 under the control of the CONT2 is on. At this time, the grid of the M2 is pulled to the ground level by the M7, and the M2 will not be on.

In the case of CONT3=H and CONT3N=L, the TG5 under control is not on, and the M6 is on. At this time, the grid of the M2 is pulled to the ground level by the M6, and the M1 will not be on.

In such case, this path has no current when selected no matter how is M3 connected. The feedback module is equivalent to the feedback unit d in FIG. 4, equivalent to the feedback unit d in FIG. 2 of the present disclosure.

The above circuit is not limited to the MOS transistor, and can be obtained using other active or inactive devices.

Embodiment 2

Figure 5:
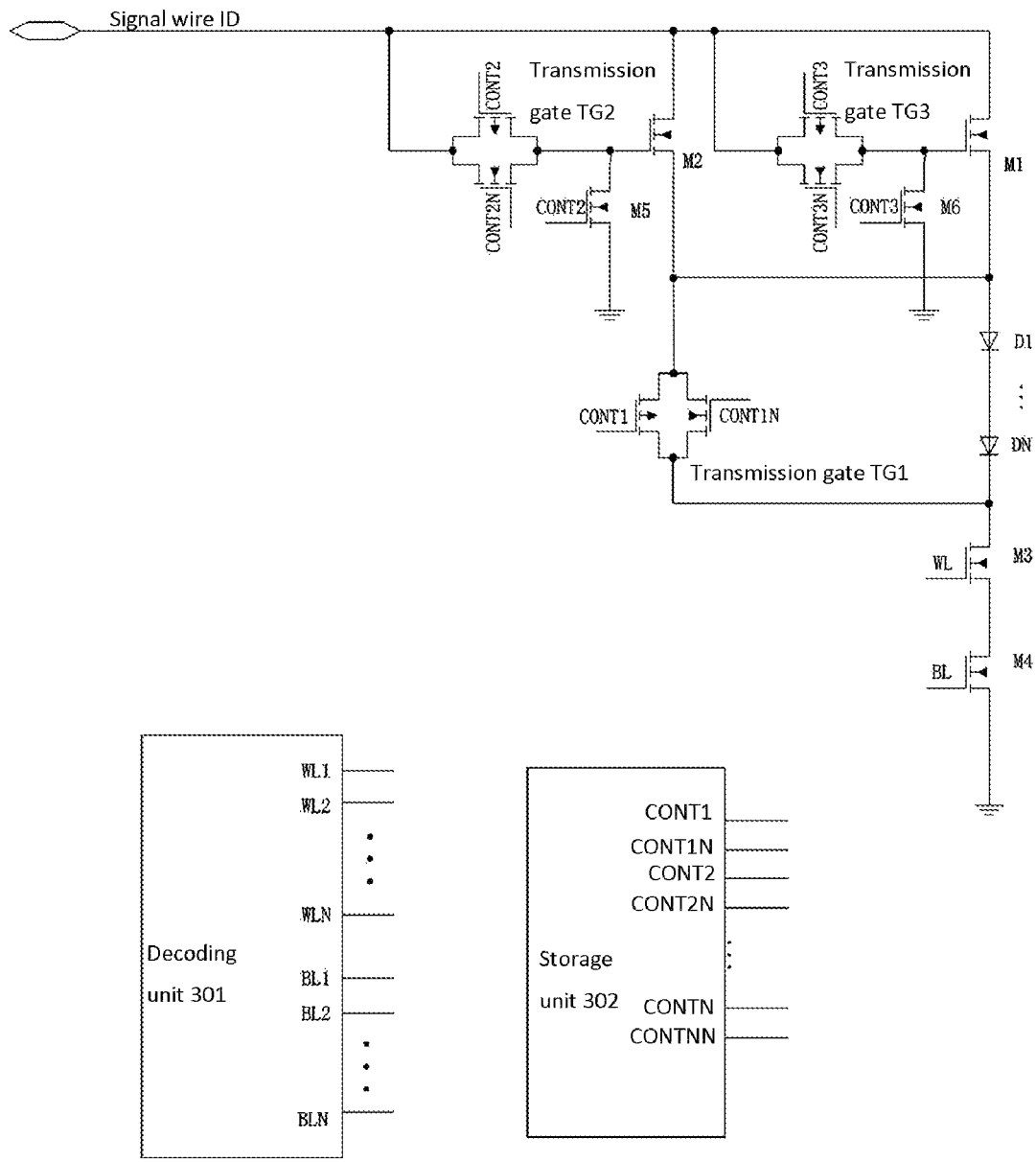
FIG. 5 shows a feedback circuit in Embodiment 2 of the present disclosure.
Figure 6:
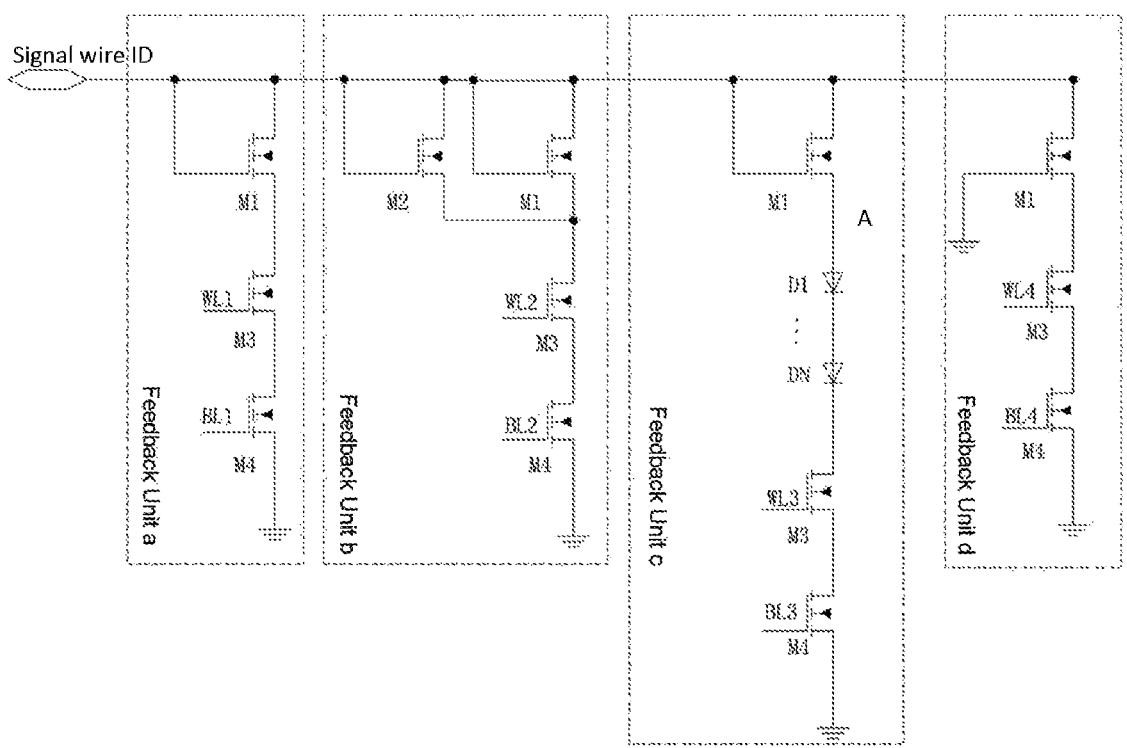
FIG. 6 is an equivalent circuit diagram of the feedback circuit in Embodiment 2 of the present disclosure, in four states.

FIG. 5 shows another implementation way of the feedback circuit of the present disclosure. In this embodiment, a feedback module is switched among four feedback units through a switch under the control of a storage unit 302 (as shown in FIG. 6). The feedback circuit includes a decoding unit 301, a storage unit 302, three switches TG1-TG3 each constituted by transmission gates, six MOS transistors M1-M6, and N pieces of diodes D1-DN. Each switch that is constituted by the transmission gates is comprised of a PMOS transistor and an NMOS transistor, wherein a source of each one of the PMOS transistors and a source of each corresponding one of the NMOS transistors are short-circuited as an input, a drain of each one of the PMOS transistors and a drain of each corresponding one of the NMOS transistors are short-circuited as an output, a grid of each one of the PMOS transistors and a grid of each corresponding one of the NMOS transistors are respectively connected with opposite input signals; when the grid of each one of the PMOS transistors is input with a low level and the grid of each corresponding one of the NMOS transistors is input with a high level, each corresponding one of the switches is on; and when the grid of each one of the PMOS transistors is input with a high level and the grid of each corresponding one of the NMOS transistors is input with a low level, each corresponding one of the switches is off.

An input terminal of the TG2 is connected to the output terminal of the feedback circuit (namely the signal line ID); a grid of an NMOS transistor in the TG2 is connected to a CONT2N signal output by the storage unit 302; a grid of a PMOS transistor is connected to a CONT2 signal output by the storage unit 302; and an output terminal of the TG2 is connected to a grid of the M2 and a drain of the M5. A source of the M5 is grounded, and a grid of the M5 is connected with the CONT2 signal output by the storage unit 302. A drain of the M2 is connected to the signal line ID, and a source of the M2 is connected to a source of the M1, an input terminal of the TG1 and a positive terminal of the diode D1. A drain of the M1 is connected to the signal line ID, and a grid of the M1 is connected with a drain of the M6 and an output terminal of the TG3. A source of the M6 is grounded, and a grid of the M6 is connected to a CONT3 signal output by the storage unit 302. A grid of an NMOS transistor in the TG3 is connected to a CONT3N signal output by the storage unit 302; a grid of a PMOS transistor is connected to the CONT3 signal output by the storage unit 302; and an input terminal of the TG3 is connected to the signal line ID. A grid of an NMOS transistor in the TG1 is connected to a CONT1N signal output by the storage unit 302; a grid of a PMOS transistor is connected to a CONT1 signal output by the storage unit 302; and an output terminal of the TG1 is connected to a negative terminal of the diode DN. N pieces of diodes are connected in series between the D1 and the DN. A drain of the M3 is connected with the output terminal of the TG1 and the negative terminal of the diode DN; a grid of the M3 is connected to a WL signal that is controlled by the decoding unit 301; and a source of the M3 is connected with a drain of the M4. A grid of the M4 is connected to a BL signal that is controlled by the decoding unit 301, and a source of the M4 is grounded.

The decoding unit 301 outputs control gating signals WL1-N and BL1-N to gate a feedback module in the feedback circuit; and the storage unit 302 outputs switching signals CONT1-N and CONTN1-N to control the state of the feedback module. The feedback module as shown in FIG. 5, equivalent to the four feedback units in FIG. 6, can be controlled with the switching signals output by the storage unit 302.

(1) Feedback Unit a

In the case of CONT1=L and CONT1N=H, the TG1 under control is on, and the paths of the diodes D1-DN are short-circuited by the TG1.

In the case of CONT2=H and CONT2N=L, the TG2 under control is not on, and the M5 is on. At this time, the grid of the M2 is pulled to the ground level by the M5, and the M2 will not be on.

In the case of CONT3=L and CONT3N=H, the TG3 under control is on, and the M6 is not on. At this time, the grid of the M1 is connected to the signal line ID, and the M1 will be connected into an MOS transistor which short-circuits the grid and drain.

Based on the above, the feedback module is equivalent to the feedback unit a in FIG. 6, and this feedback unit a is equivalent to the feedback unit a in FIG. 2 of the present disclosure.

(2) Feedback Unit b

In the case of CONT1=L and CONT1N=H, the TG1 under control is on, and the paths of the diodes D1-DN are short-circuited by the TG1.

In the case of CONT2=L and CONT2N=H, the TG2 under control is on, and the M5 is not on. At this time, the grid of the M2 is connected to the signal line ID, and the M2 will be connected into an MOS transistor which short-circuits the grid and the drain.

In the case of CONT3=L and CONT3N=H, the TG3 under control is on, and the M6 is not on. At this time, the grid of the M1 is connected to the signal line ID, and the M1 will be connected into an MOS transistor which short-circuits the grid and drain.

Based on the above, the feedback module is equivalent to the feedback unit b in FIG. 6, and the feedback unit b is equivalent to the feedback unit b in FIG. 2.

(3) Feedback Unit c

In the case of CONT1=H and CONT1N=L, the TG1 under control is not on, and the paths of the diodes D1-DN are connected between the source of the M1 and the drain of the M3.

In the case of CONT2=H and CONT2N=L, the TG2 under control is not on, and the M5 is on. At this time, the grid of the M2 is pulled to the ground level by the M5, and the M2 will not be on.

In the case of CONT3=L and CONT3N=H, the TG3 under control is on, and the M6 is not on. At this time, the grid of the M1 is connected to the signal line ID, and the M1 will be connected into a MOS transistor which short-circuits the grid and drain.

Based on the above, the feedback module is equivalent to the feedback unit c in FIG. 6. In such case, the voltage of a point A is equal to the sum of the drop voltages of N pieces of diodes, namely $$V_A = n * V_T,$$

wherein:

$V_A$ is the voltage of the point A;

n is the number of the diodes in series connection;

$V_T$ is a drop voltage of a single diode.

Therefore, the diodes in series connection can be equivalent to a $V_A = n * V_T$ constant voltage source at this time, as shown in FIG. 6.

(4) Feedback Unit d

In the case of CONT2=H and CONT2N=L, the TG2 under control is not on, and the M5 is on. At this time, the grid of the M2 is pulled to the ground level by the M5, and M2 will not be on.

In the case of CONT3=H and CONT3N=L, the TG3 under control is not on, and the M6 is on. At this time, the grid of the M2 is pulled to the ground level by the M6, and the M1 will not be on.

In such case, this path has no current when selected no matter how is M3 connected. The feedback module is equivalent to the feedback unit d in FIG. 6. This feedback unit d is equivalent to the feedback unit d in FIG. 2.

Figure 9:
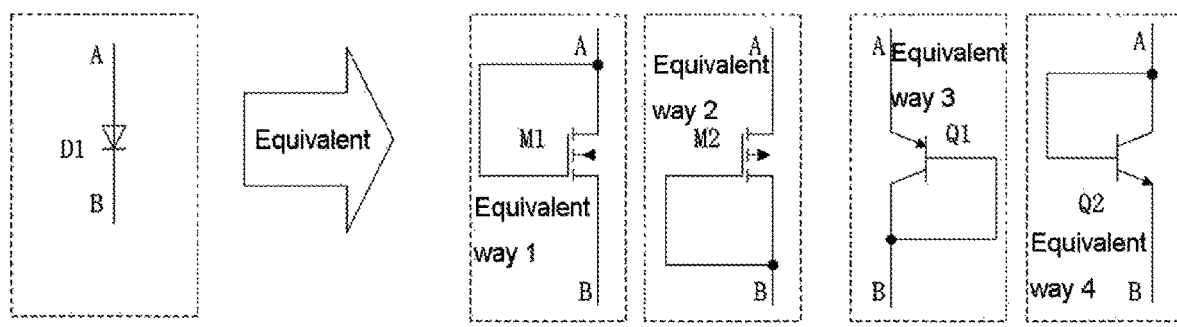
FIG. 9 is a schematic view of an equivalent implementation method of a diode.

The above circuit is not limited to the MOS transistor and diodes, and can be obtained using other active or inactive devices, for example, the above-mentioned diodes D1-DN in series connection can also be obtained using MOS transistors or by connecting triodes to form diodes. As shown in FIG. 9, the diodes can be obtained in NMOS, PMOS, PNP and NPN ways.

Embodiment 3

Figure 7:
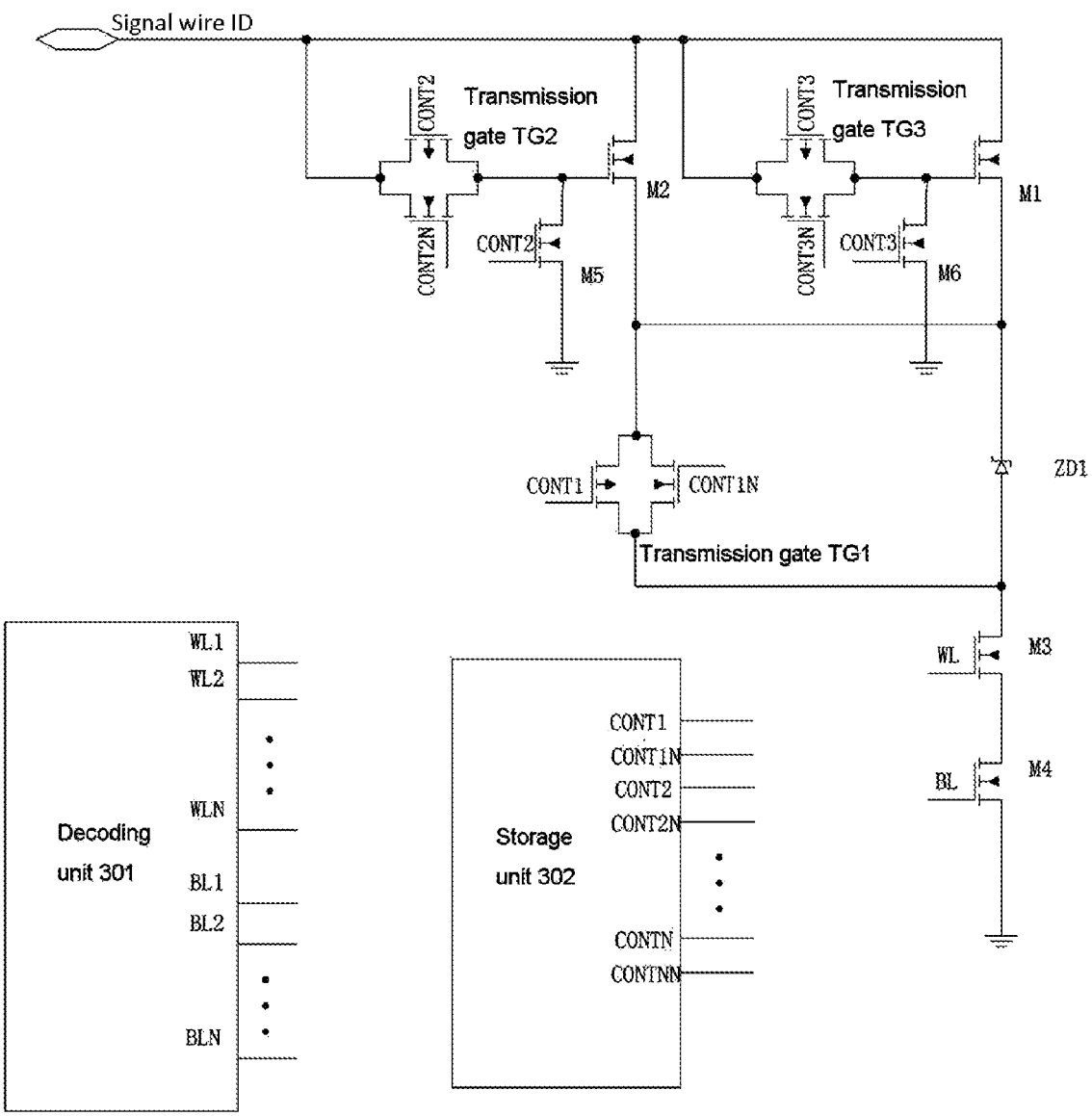
FIG. 7 shows a feedback circuit in Embodiment 3 of the present disclosure.
Figure 8:
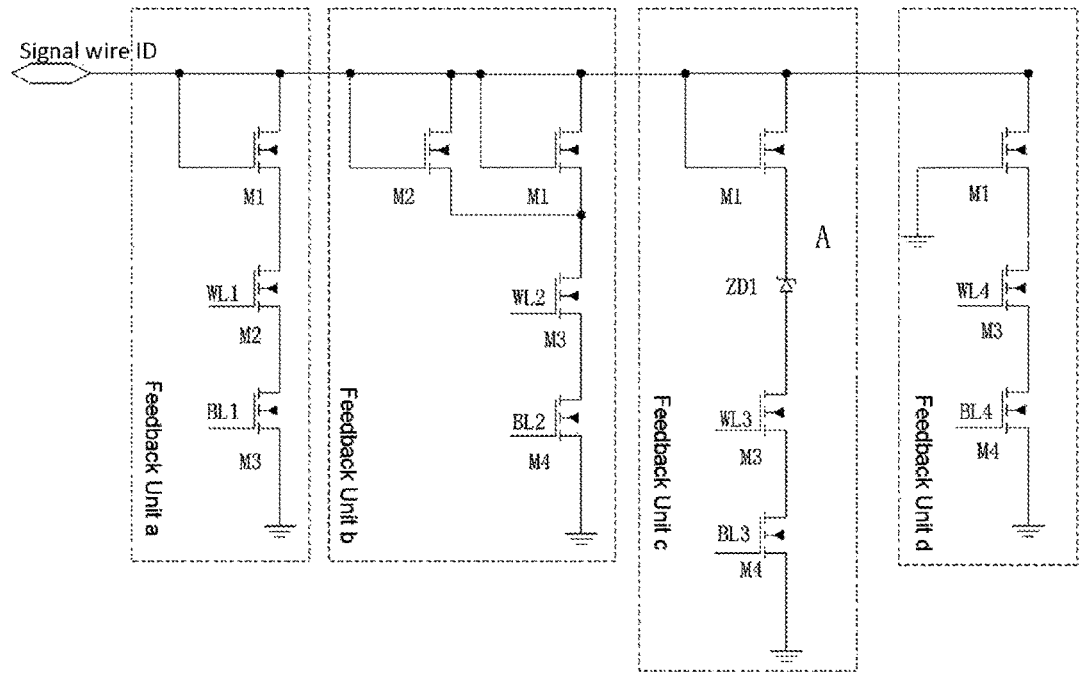
FIG. 8 is an equivalent circuit diagram of the feedback circuit in Embodiment 3 of the present disclosure, in four states.

FIG. 7 shows another implementation way of the feedback circuit of the present disclosure. In this embodiment, a feedback module is switched among four feedback units through a switch under the control of a storage unit 302 (as shown in FIG. 8). The feedback circuit includes a decoding unit 301, a storage unit 302, three switches TG1-TG3 each constituted by transmission gates, six MOS transistors M1-M6, and a voltage regulator tube ZD1. Each switch that is constituted by the transmission gates is comprised of a PMOS transistor and an NMOS transistor, wherein a source of each one of the PMOS transistors and a source of each corresponding one of the NMOS transistors are short-circuited as an input, a drain of each one of the PMOS transistors and a drain of each corresponding one of the NMOS transistors are short-circuited as an output, a grid of each one of the PMOS transistors and a grid of each corresponding one of the NMOS transistors are respectively connected with opposite input signals; when the grid of each one of the PMOS transistors is input with a low level and the grid of each corresponding one of the NMOS transistors is input with a high level, each corresponding one of the switches is on; and when the grid of each one of the PMOS transistors is input with a high level and the grid of each corresponding one of the NMOS transistors is input with a low level, each corresponding one of the switches is off.

An input terminal of the TG2 is connected to the output terminal of the feedback circuit (namely the signal line ID); a grid of an NMOS transistor in the TG2 is connected to a CONT2N signal output by the storage unit 302; a grid of a PMOS transistor is connected to a CONT2 signal output by the storage unit 302; and an output terminal of the TG2 is connected to a grid of the M2 and a drain of the M5. A source of the M5 is grounded, and a grid of the M5 is connected with the CONT2 signal output by the storage unit 302. A drain of the M2 is connected to the signal line ID, and a source of the M2 is connected to a source of the M1, an input terminal of the TG1 and a negative terminal of the voltage regulator tube ZD1. A drain of the M1 is connected to the signal line ID, and a grid of the M1 is connected with a drain of the M6 and an output terminal of the TG3. A source of the M6 is grounded, and a grid of the M6 is connected to a CONT3 signal output by the storage unit 302. A grid of an NMOS transistor in the TG3 is connected to a CONT3N signal output by the storage unit 302; a grid of a PMOS transistor is connected to the CONT3 signal output by the storage unit 302; and an input terminal of the TG3 is connected to the signal line ID. A grid of an NMOS transistor in the TG1 is connected to a CONT1N signal output by the storage unit 302; a grid of a PMOS transistor is connected to a CONT1 signal output by the storage unit 302; and an output terminal of the TG1 is connected to a positive terminal of the voltage regulator tube ZD1. A drain of the M3 is connected with the output terminal of the TG1 and the negative terminal of the diode DN; a grid of the M3 is connected to a WL signal that is controlled by the decoding unit 301; and a source of the M3 is connected with a drain of the M4. A grid of the M4 is connected to a BL signal that is controlled by the decoding unit 301, and the source of the M4 is grounded.

The decoding unit 301 outputs control gating signals WL1-N and BL1-N to gate a feedback module in the feedback circuit; and the storage unit 302 outputs switching signals CONT1-N and CONTN1-N to control the state of the feedback module. The feedback module as shown in FIG. 7, equivalent to the four feedback units in FIG. 8, can be controlled with the switching signals output by the storage unit 302.

(1) Feedback Unit a

In the case of CONT1=L and CONT1N=H, the TG1 under control is on, and the path of the voltage regulator tube ZD1 is short-circuited by the TG1.

In the case of CONT2=H and CONT2N=L, the TG2 under control is not on, and the M5 is on. At this time, the grid of the M2 is pulled to the ground level by the M5, and M2 will not be on.

In the case of CONT3=L and CONT3N=H, the TG3 under control is on, and the M6 is not on. At this time, the grid of the M1 is connected to the signal line ID, and the M1 will be connected into a MOS transistor which short-circuits the grid and drain.

Based on the above, the feedback module is equivalent to the feedback unit a in FIG. 8, and this feedback unit a is equivalent to the feedback unit a in FIG. 2 of the present disclosure.

(2) Feedback Unit b

In the case of CONT1=L and CONT1N=H, the TG1 under control is on, and the path of the voltage regulator tube ZD1 is short-circuited by the TG1.

In the case of CONT2=L and CONT2N=H, the TG2 under control is on, and the M5 is not on. At this time, the grid of the M2 is connected to the signal line ID, and the M2 will be connected into an MOS transistor which short-circuits the grid and the drain.

In the case of CONT3=L and CONT3N=H, the TG3 under control is on, and the M6 is not on. At this time, the grid of the M1 is connected to the signal line ID, and the M1 will be connected into an MOS transistor which short-circuits the grid and drain.

Based on the above, the feedback module is equivalent to the feedback unit b in FIG. 8, and the feedback unit b is equivalent to the feedback unit b in FIG. 2.

(3) Feedback Unit c

In the case of CONT1=H and CONT1N=L, the TG1 under control is not on, and the path of the voltage regulator tube ZD1 is connected between the source of the M1 and the drain of the M3.

In the case of CONT2=H and CONT2N=L, the TG2 under control is not on, and the M5 is on. At this time, the grid of the M2 is pulled to the ground level by the M5, and M2 will not be on.

In the case of CONT3=L and CONT3N=H, the TG3 under control is on, and the M6 is not on. At this time, the grid of the M1 is connected to the signal line ID, and the M1 will be connected into a MOS transistor which short-circuits the grid and drain.

Based on the above, the feedback module is equivalent to the feedback unit c in FIG. 8. The characteristic of the voltage regulator tube is that when a certain current flows through the voltage regulator tube, the negative terminal of the voltage regulator tube is regulated to a constant voltage value $V_Z$. At this time, the voltage of point A is equal to the constant voltage $V_Z$, namely:

$$V_A = V_Z,$$

wherein:

$V_A$ is the voltage of the point A;

$V_Z$ is the regulated voltage of the voltage regulator tube ZD1.

Therefore, the voltage regulator tube ZD1 can be equivalent to a $V_A = V_Z$ constant voltage source in such circumstances, as shown in FIG. 8.

(4) Feedback Unit d

In the case of CONT1=L and CONT1N=H, the TG1 under control is on, and the path of the voltage regulator tube ZD1 is short-circuited by the TG1.

In the case of CONT2=H and CONT2N=L, the TG2 under control is not on, and the M5 is on. At this time, the grid of the M2 is pulled to the ground level by the M5, and M2 will not be on.

In the case of CONT3=H and CONT3N=L, the TG3 under control is not on, and the M6 is on. At this time, the grid of the M2 is pulled to the ground level by the M6, and M1 will not be on.

In such case, this path has no current when selected no matter how is M3 connected. The feedback module is equivalent to the feedback unit d in FIG. 8. This feedback unit d is equivalent to the feedback unit d in FIG. 2.

The above circuit is not limited to the MOS transistor and the voltage regulator tube, and can be obtained using other active or inactive devices.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A threshold variable feedback circuit, characterized by comprising: a control unit; a feedback module, comprising four different feedback units that are connected between an output terminal and ground in parallel; wherein each feedback unit comprises plurality of transistors coupled in series;
wherein each one of the feedback units comprises a gating component and a feedback component that are connected in series between the output terminal and the ground;
the control unit is electrically connected with the gating component of each one of the feedback units such that the feedback module selects and outputs an electrical signal of one of the feedback units to the output terminal; wherein the feedback component of a first feedback unit is a first feedback transistor, and when the first feedback unit is selected, voltage of a drain of the first feedback transistor is output; wherein the feedback component of a second feedback unit is a second feedback transistor, and when the second feedback unit is selected, voltage of a drain of the second feedback transistor is output; wherein the feedback component of a third feedback unit is comprised of a third feedback transistor and a DC power supply that are connected in series, and when the third feedback unit is selected, the sum of voltage of a drain of the third feedback transistor and voltage of the DC power supply is output; wherein the feedback component of a fourth feedback unit is a fourth feedback transistor, and a grid of the fourth feedback transistor is grounded such that current in the fourth feedback unit is 0 when the fourth feedback unit is selected; and the width-to-length ratio of the first feedback transistor is different from that of the second feedback transistor.

2. The threshold variable feedback circuit according to claim 1, wherein the first feedback transistor, the second feedback transistor, the third transistor and the fourth transistor are common MOS transistors.

3. The threshold variable feedback circuit according to claim 1, wherein the first feedback transistor is NMOS transistor; a grid of the first feedback transistor is connected to the output terminal; the drain of the first feedback transistor is connected to the output terminal; and a source of the first feedback transistor is connected to a corresponding gating component.

4. The threshold variable feedback circuit according to claim 1, wherein the second feedback transistor is NMOS transistor; a grid of the second feedback transistor is connected to the output terminal; the drain of the second feedback transistor is connected to the output terminal; and a source of the second feedback transistor is connected to a corresponding gating component.

5. The threshold variable feedback circuit according to claim 1, wherein the third feedback transistor is NMOS transistor; a grid of the third feedback transistor is connected to the output terminal; the drain of the third feedback transistor is connected to the output terminal; a source of the third feedback transistor is connected to an anode of the DC power supply, and a cathode of the DC power supply is connected to a corresponding gating component.

6. The threshold variable feedback circuit according to claim 1, wherein the fourth feedback transistor is NMOS transistor; the drain of the fourth feedback transistor is connected to the output terminal; and a source of the fourth feedback transistor is connected to a corresponding gating component.

7. The threshold variable feedback circuit according to claim 1, wherein a plurality of feedback modules are provided, and the plurality of feedback modules are connected in parallel.

8. The threshold variable feedback circuit according to claim 1, wherein the control unit is a decoder.

9. The threshold variable feedback circuit according to claim 1, wherein the each one of the gating component is arranged between each corresponding one of the feedback units and the ground in a series connection way;
the each one of the gating components comprises a first gating transistor and a second gating transistor; a drain of each one of the first gating transistors is connected with the feedback components, a source of each one of the first gating transistors is connected to a drain of each corresponding one of the second gating transistors, while a source of each corresponding one of the second gating transistors is grounded; and a grid of each one of the first gating transistors and a grid of each one of the second gating transistors are connected to a control output terminal of the control unit.

10. A consumable chip, characterized by comprising a storage unit and the feedback circuit according to claim 1, wherein the storage unit is connected to a control input terminal of the control unit.

11. A consumable, characterized by comprising a consumable container and the consumable chip according to claim 10, wherein the consumable chip is installed on the consumable container.

12. The consumable chip, characterized by comprising the storage unit and the feedback circuit according to claim 10, wherein the first feedback transistor, the second feedback transistor, the third transistor and the fourth transistor are common MOS transistors.

13. The consumable chip, characterized by comprising the storage unit and the feedback circuit according to claim 10, wherein the first feedback transistor is NMOS transistor; a grid of the first feedback transistor is connected to the output terminal; a drain of the first feedback transistor is connected to the output terminal; and a source of the first feedback transistor is connected to a corresponding gating component.

14. The consumable chip, characterized by comprising the storage unit and the feedback circuit according to claim 10, wherein the second feedback transistor is NMOS transistor; a grid of the second feedback transistor is connected to the output terminal; a drain of the second feedback transistor is connected to the output terminal; and a source of the second feedback transistor is connected to a corresponding gating component.

15. The consumable chip, characterized by comprising the storage unit and the feedback circuit according to claim 10, wherein the third feedback transistor is NMOS transistor; a grid of the third feedback transistor is connected to the output terminal; a drain of the third feedback transistor is connected to the output terminal; a source of the third feedback transistor is connected to an anode of the DC power supply, and a cathode of the DC power supply is connected to a corresponding gating component.

16. The consumable chip, characterized by comprising the storage unit and the feedback circuit according to claim 10, wherein the fourth feedback transistor is NMOS transistor; a drain of the fourth feedback transistor is connected to the output terminal; and a source of the fourth feedback transistor is connected to a corresponding gating component.

17. The consumable chip, characterized by comprising the storage unit and the feedback circuit according to claim 10, wherein a plurality of feedback modules are provided, and the plurality of feedback modules are connected in parallel.

18. The consumable chip, characterized by comprising the storage unit and the feedback circuit according to claim 10, wherein the control unit is a decoder.

19. The consumable chip, characterized by comprising the storage unit and the feedback circuit according to claim 10, wherein the each one of the gating component is arranged between each corresponding one of the feedback units and the ground in a series connection way;

the each one of the gating components comprises a first gating transistor and a second gating transistor; a drain of each one of the first gating transistors is connected with the feedback components, a source of each one of the first gating transistors is connected to a drain of each corresponding one of the second gating transistors, while a source of each corresponding one of the second gating transistors is grounded; and a grid of each one of the first gating transistors and a grid of each one of the second gating transistors are connected to a control output terminal of the control unit.

\* \* \* \* \*